Figure 3:
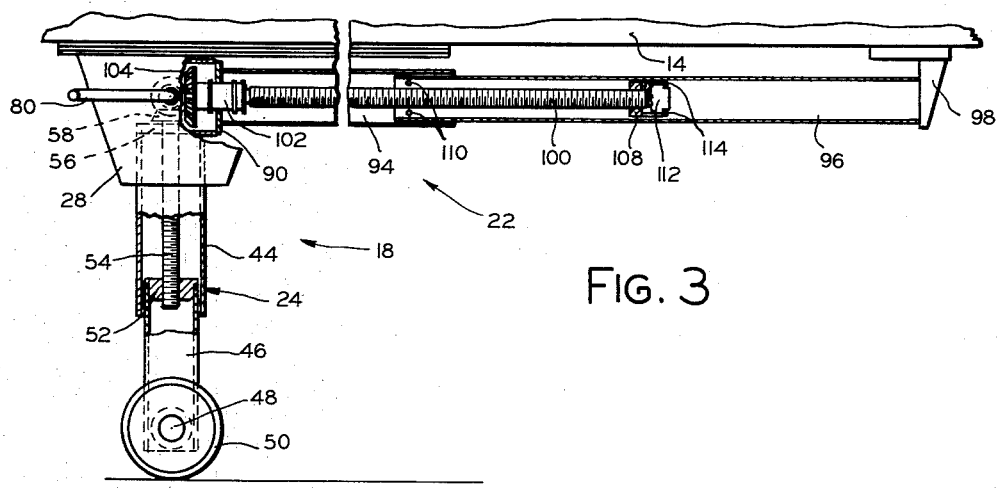

April 26, 1966 E. HAMMOND 3,248,084
SEMI-TRAILER LANDING GEAR ASSEMBLY
Filed Oct. 14, 1964 3 Sheets-Sheet 1
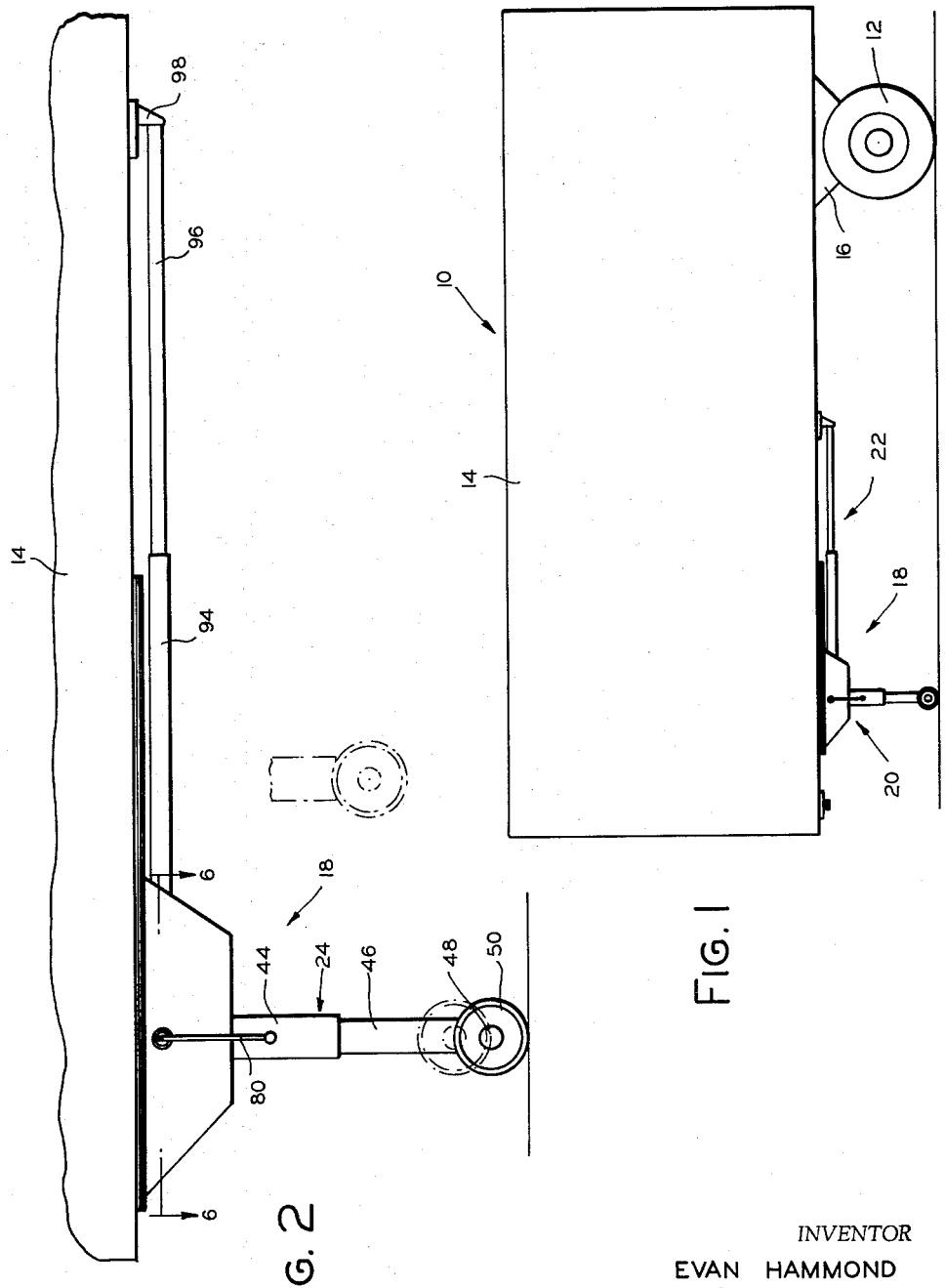
INVENTOR
EVAN HAMMOND
BY Robert H Johnson
ATTORNEY April 26, 1966           E. HAMMOND           3,248,084

SEMI-TRAILER LANDING GEAR ASSEMBLY

Filed Oct. 14, 1964           3 Sheets-Sheet 2

*INVENTOR*
EVAN HAMMOND
BY *Robert H. Johnson*

ATTORNEY

April 26, 1966  E. HAMMOND  3,248,084

SEMI-TRAILER LANDING GEAR ASSEMBLY

Filed Oct. 14, 1964  3 Sheets-Sheet 3

INVENTOR
EVAN HAMMOND
BY Robert H. Johnson
ATTORNEY

| United States Patent Office | 3,248,084
Patented Apr. 26, 1966 |

3,248,084
SEMI-TRAILER LANDING GEAR ASSEMBLY
Evan Hammond, Michigan City, Ind., assignor to Clark Equipment Company, Michigan City, Ind., a corporation of Michigan
Filed Oct. 14, 1964, Ser. No. 403,721
8 Claims. (Cl. 254—86)

This invention relates to landing gear assemblies for semi-trailers, and more particularly to such assemblies in which a retractable landing gear is arranged to move longitudinally along the semi-trailer during extension or retraction of the ground engaging portion of the landing gear.

The semi-trailer which is being referred to herein forms a part of the so-called "semi-trailer truck" is commonly seen on the highways. A semi-trailer truck ordinarily includes a highway tractor unit which pulls a semi-trailer unit that may vary in length from 24 feet to 40 feet or longer. Hereinafter these units will be referred to as tractors and trailers. The tractor and trailer are connected to each other by means of a pivotal connection called a fifth wheel hitch, and can be disconnected from each other at this point. Since a trailer of the type contemplated herein ordinarily has supporting wheels adjacent the rear end thereof only, some means must be provided for supporting the front end of the trailer when the trailer is not supported by a tractor. To this end trailers usually are equipped with a landing gear, of which many types are known, which serves to support the front end of the trailer when it is not supported by a tractor. In order to prevent interference between the landing gear and the ground when the trailer is being supported by a tractor, the landing gear is made so that the ground engaging portion is retractable. Also, the landing gear must be located on the trailer far enough to the rear of the tractor so that there is sufficient clearance for horizontal pivotal movement between the tractor and trailer to permit disposing the two units at substantially 90° relative to each other during maneuvering of the two units when, for example, the trailer is being backed up to a loading dock.

It is sometimes desirable to hitch a relatively short length trailer, e.g., 27 feet in length, to a tractor with a long wheel base. In order to have sufficient clearance for maneuvering the two units, the landing gear may have to be located as much as 11.6 feet back from the front end of the trailer. However, the trailer might be unstable and tend to tip over forwardly under certain loading conditions if supported by the landing gear located so far back from the front end of the trailer. In order to provide an arrangement that is stable from the standpoint of preventing the trailer from tipping over forwardly, the landing gear should be positioned approximately 8.6 feet back from the front end of the trailer. Thus, the landing gear must occupy a position, in this case, which is three feet forward of the position that it must occupy to provide sufficient clearance for maneuvering, as explained hereinabove. Consequently, it is necessary to have a landing gear that is not only retractable, but also can be moved readily between two longitudinally spaced apart positions on the trailer. There is at least one such landing gear presently available commercially; however, this landing gear is raised or lowered through the action of one mechanism and moved longitudinally through the action of another separate mechanism. Such an arrangement of mechanisms is undesirable from the standpoint of safety and prevention of damage to the landing gear. For example, the operator may forget to move the landing gear rearwardly or fully to the rearmost position of the landing gear following retraction of the landing gear with the result that the landing gear is damaged during pivotal movement between the trailer and tractor due to insufficient clearance between the two units. More seriously, the landing gear may be extended upon disconnection of the trailer from the tractor, but, through inadvertence or otherwise, not moved to its forwardmost position. As a result, the trailer is in an unstable position, as pointed out previously, and may tip over forwardly, especially if a lift truck is being used to load or unload the trailer and is driven into the trailer to a point forward of the landing gear. Clearly, should the trailer tip over forwardly serious damage could result to the trailer and any cargo contained therein as well as personal injury to anyone in or near the tariler. In view of the foregoing, it is a principal object of my invention to provide a landing gear assembly in which the forward and rearward movements of the landing gear are cordinated iwth the extension and retraction movements of it.

Another object of my invention is to provide a landing gear assembly which is movable between an extended forward position and a retracted rearward position through actuation of a single mechanism.

Yet another object of my invention is to provide an improved landing gear assembly in which the ground engaging portion moves only vertically during initial retraction, and then moves both vertically and longitudinally during further retraction.

In carrying out my invention in a preferred embodiment I provide a landing gear that is slidably connected to a trailer for longitudinal movement relative thereto. The landing gear includes a ground engaging member which is actuatable vertically and a screw and nut mechanism operable by a hand crank to actuate the ground engaging member vertically. Connected to the landing gear is a screw which is operably connected to the hand crank for rotation upon operation of the hand crank. The screw threadably engages a first nut which is slidably connected to the trailer for longitudinal movement relative thereto and is threadably engageable with a second nut which ratchets for one direction of rotation of the screw. A stop limits the forward longitudinal movement of the first nut.

In a modification of my invention the second nut does not ratchet and is fixed to the trailer.

Figure 4:
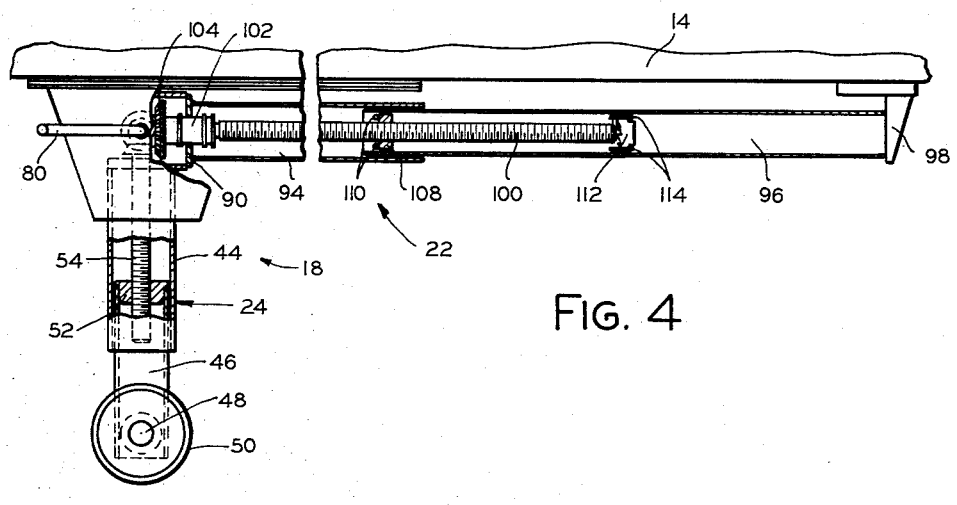
Figure 5:
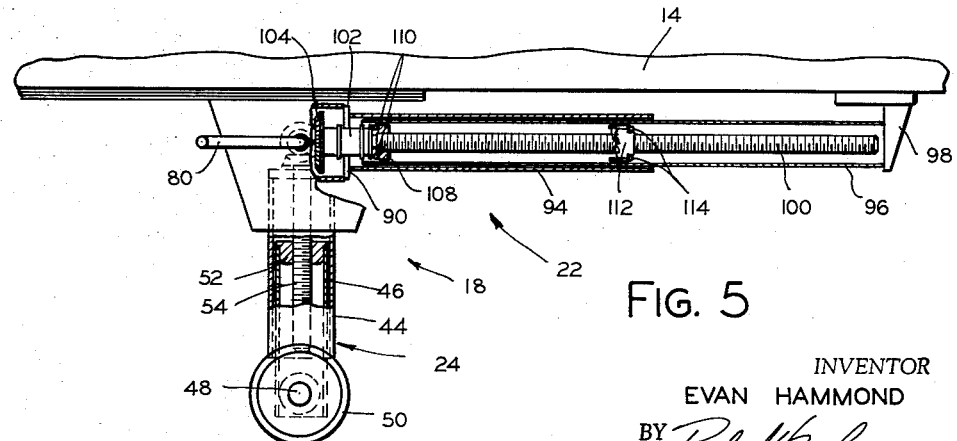
Figure 6:
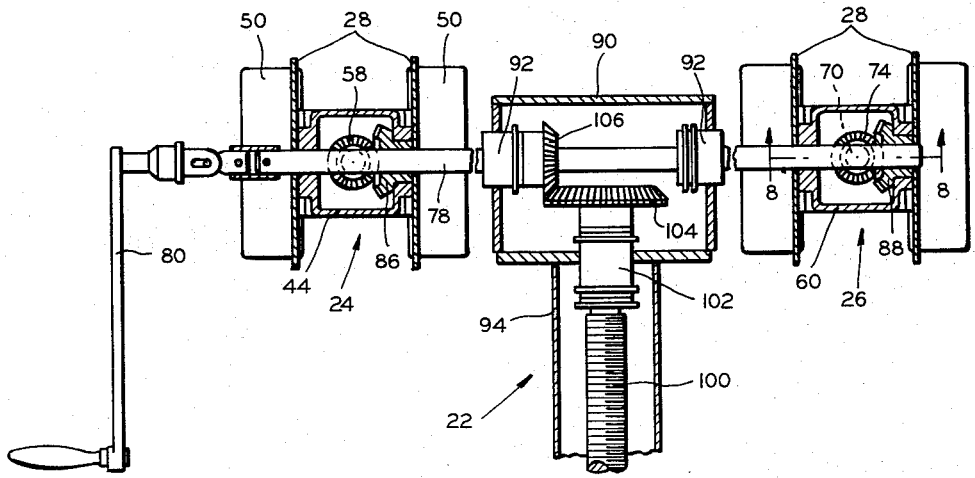
Figure 9:
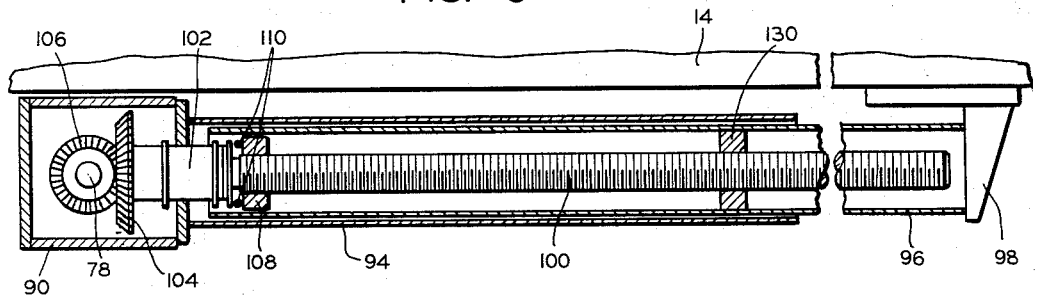
Figure 7:
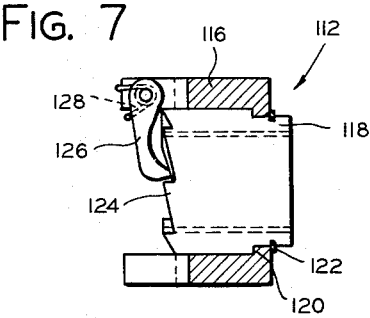
Figure 8:
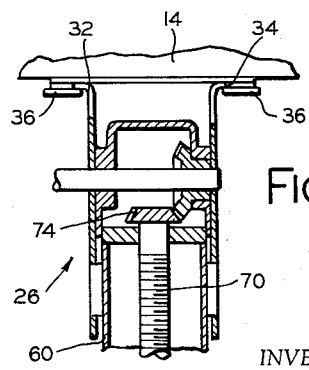

The above and other objects, features and advantages of my invention will become more readily apparent to one skilled in the art from the following detailed description when taken in conjunction with the accompanying drawing wherein:

FIGURE 1 shows my invention used in conjunction with a trailer,
FIGURE 2 is a side elevation on an enlarged scale of my invention,
FIGURES 3, 4 and 5 are schematic views of my invention showing to advantage the relationship of various parts thereof in various positions of operation,
FIGURE 6 is a partial sectional view on an enlarged scale taken along line 6—6 of FIGURE 2,
FIGURE 7 shows in detail the nut and ratchet assembly,
FIGURE 8 is an enlarged fragmentary section along line 9—9 of one landing gear leg, and
FIGURE 9 shows a modification of my invention.

Referring to FIG. 1, there is shown a trailer 10 which is supported at the rear end thereof by ground engaging wheels 12, only one of which is shown, which are connected to opposite ends of an axle, not shown. The axle is connected to a body 14 of the trailer by means of any suitable suspension 16. The trailer 10 is supported at the front end thereof by means of a landing gear assembly 18 which is connected to the underside of body 14. The landing gear assembly 18 will be seen to include a landing gear 20 and mechanism 22 for moving landing gear 20 longitudinally relative to the trailer body 14.

Referring now specifically to FIGS. 6 and 8, the landing gear 20 includes a pair of legs 24 and 26 which are connected to pairs of plates 28. Plates 28 have outwardly extending flanges 32 (FIG. 8) at the upper end thereof which register in grooves 34 on the opposite sides of tracks 36 that extend longitudinally relative to trailer body 14 and are fixed thereto. It will be appreciated that there is sufficient clearance between the flanges and grooves to permit sliding movement of landing gear 20 along tracks 36.

The leg 24 of landing gear 18 includes an upper tubular member 44 which is fixed to plate 28. Telescoped within member 44 for sliding movement relative thereto is a lower tubular member 46. Rotatably journaled at the bottom end of member 46 is an axle 48 to which ground engaging wheels 50 are attached at opposite ends thereof. A nut 52 is disposed within member 46 at the upper end thereof and connected thereto by any suitable means, such as welding. A screw 54 threadably engages nut 52 and is rotatably journaled in a support plate 56 connected to the upper end of member 44. Connected to the portion of screw 54 which extends above support plate 56 is a bevel gear 58 which meshes with another gear as will be explained more fully shortly.

The leg 26 is substantially identical to leg 24, and so will not be described further, except to note that it includes an upper tubular member 60 connected to plates 28, a screw 70 and a bevel gear 74 connected to screw 70.

It will be understood that legs 24 and 26 are connected for longitudinal movement together by suitable cross bracing (not shown) as well as by a cross shaft 78.

The cross shaft 78 is rotatably journaled in side plates 28 and connected for rotation to a crank handle 80. Connected to cross shaft 78 for rotation therewith and in mesh with bevel gear 58 is a bevel gear 86. A similar bevel gear 88 is connected to cross shaft 78 for rotation therewith and in mesh with bevel gear 74. At this point it will be seen that rotation of crank handle 80 causes rotation of cross shaft 78, and that respective rotation of screws 54 and 70 is caused through bevel gear trains 58, 86 and 74, 88. Rotation of screws 54 and 70 in one direction causes legs 24 and 26 to be raised and rotation of screws 54 and 70 in the opposite direction causes legs 24 and 26 to be lowered.

The mechanism 22 for actuating landing gear 18 longitudinally of the trailer will now be described in detail. Mechanism 22 is located substantially midway between landing gear legs 24 and 26 directly beneath the underside of body 14 and is connected at one end to body 14 and at the other end to landing gear 18. A generally rectangular box structure 90 is connected to landing gear 18 by means of a pair of journals 92 through which cross shaft 78 passes. Fixed to box 90 by any suitable means, such as welding, is a tubular member 94 of generally rectangular cross-section and within which another tubular member 96 of rectangular cross-section is slidably telescoped. Tubular member 96 supports a pair of threaded members and is fixed to trailer body 14 by means of a bracket 98. Also, a screw 100 is rotatably mounted in a journal 102 which is fixed to box 90 so that screw 100 cannot move longitudinally relative to box 90. A bevel gear 104 is fixed to one end of screw 100 and meshes with another bevel gear 106 which is fixed to cross shaft 78 so that rotation of cross shaft 78 causes rotation of screw 100.

Slidably disposed in tubular member 96 is a rectangular nut or threaded member 108 which at all times is threadably engaged by screw 100. Nut 108 is movable between a pair of pins 110 which extend across tubular member 96 and serve as stops and a nut assembly 112. Nut assembly 112 normally abuts a pair of pins 114 which extend across tubular member 96 and serve as stops. As will be noted from a reference to FIG. 7, nut assembly 112 includes a generally rectangular support member 116 within which a threaded member 118 is rotatably journaled. Member 118 is fixed to member 116 through the cooperation of a shoulder 120 and a snap ring 122. Member 118 is, of course, threaded to accept screw 100. Nut assembly 112 includes a ratchet mechanism comprising ratchet teeth 124 on one end of member 118 and a pawl 126 which is pivotally mounted on member 116 and biased into engagement with teeth 124 by means of a spring 128 so that member 118 can rotate in a clockwise direction only relative to member 116 when viewed from the left in FIG. 7. By arranging nut assembly 112 so that the threaded member 118 is free to rotate in one direction relative to member 116, nut assembly 112 is prevented from being threaded onto screw 100 at an improper time should the end of screw 100 engage nut assembly 112 too soon as will be explained in more detail hereinafter.

In order to better enable one to understand and practice my invention, I will now describe the operation of the above-described embodiment.

It will be assumed that it is desired to connect trailer 10 to a tractor and that the landing gear assembly 18 is in the position shown in FIGS. 1, 2 and 3. As the tractor unit backs up to the trailer for connection thereto it may be necessary to adjust the front end height of the trailer due to the fact that the fifth wheel height of the tractor may be different from the one which previously pulled the trailer. Therefore, rotation of crank handle 80 permits a vertical adjustment of the front end of the trailer 10 through the range of vertical travel of ground engaging wheels 50 as shown in FIG. 2. In actual practice this distance is about 5", although it could be made more or less. Assuming now that the trailer and tractor are coupled together and the landing gear assembly is in the position shown in FIGS. 2 and 3, the operator then turns crank handle 80 in the direction to retract or raise the ground engaging wheels through rotation of screws 54 and 70 which causes legs 24 and 26 to move upwardly. Rotation of crank handle 80 also causes rotation of screw 100 through gear train 106 and 104. Rotation of crank handle 80 in a direction to cause legs 24 and 26 to retract also causes rotation of screw 100 in a direction to cause nut 108 to move toward the left as viewed in FIG. 3 from a position adjacent nut assembly 112 toward pins 110. Since nut 108 is free to slide in tubular member 96, initial rotation of screw 100 merely causes nut 108 to move leftward until it comes into abutment with pins 110. Thereupon, further rotation of screw 100 acts to pull landing gear 20 toward the right as viewed in FIG. 3. Thus, continued rotation of crank handle 80 after nut 108 abuts pins 110 results in a combined vertical and horizontal movement of the ground engaging wheels to finally bring them to the position shown in FIG. 5. At this point the ground engaging wheels are fully retracted or raised and the landing gear 20 is moved to the right end of tracks 36. It will be noted that the path of the ground engaging wheels during retraction of the landing gear initially was a purely vertical movement, and then a combined vertical and rearward movement.

Now if the operator desires to extend the ground engaging wheels into contact with the ground from the position shown in FIG. 5, the crank handle 80 is rotated in a direction opposite to the direction of rotation for retraction. The screws 54 and 70 rotate to cause legs 24 and 26 to lower or extend. At the same time screw 100 is rotated in a direction which causes landing gear 20 to move toward the left as viewed in FIG. 5. Landing gear 20 initially moves toward the left because screw 100 is tending to thread itself out of nut assembly 112 which, of course, cannot move toward the right because of pins 114. Screw 100 also is threading itself out of nut 108 at the same time, but the location of nut 108 remains unchanged during the leftward movement of landing gear 20 because it is tending to move toward the right only at the same speed as screw 100 is tending to move toward the left. When screw 100 finally is threaded completely out of nut assembly 112 landing gear 20 will no longer move toward the left. Nut 108 then moves toward the right upon continued rotation of screw 100 as the legs 24 and 26 are continued to be extended into contact with the ground. At this point it will be evident that the path of the ground engaging wheels is the same for extension and forward movement as it is for retraction and rearward movement. Further, the final portion of the downward movement of the ground engaging wheels is not accompanied with any horizontal movement of the landing gear. This is important because it permits adjustments to be made for variations in ground irregularity and the like, but yet allows the landing gear 20 to be brought to its full forward position.

In the event that the end of screw 100 is brought into threading engagement with nut asembly 112 during retraction of landing gear 20 prior to the time that nut 108 abuts pins 110 the ratchet feature of nut assembly 112 comes into play. Shuold the above situation occur, then threaded member 118 of nut assembly 112 merely rotates in member 116 together with screw 100, and so maintains its position adjacent pins 114. If such were not the case the timing of the landing gear assembly 18 would be incorrect so that during the final portion of extension of the landing gear there would still be some horizontal movement which would be undesirable.

Except as a safeguard against having improper timing between nut 108 and nut assembly 112 the ratchet feature of nut assembly 112 is not essential to the operation of my invention; nor is it necessary for nut assembly 112 to be slidably mounted in tubular member 96. Consequently, FIG. 9 shows a modification to my invention in which nut assembly 112 is replaced by a non-ratcheting type nut 130 which is fixed to tubular member 96 by any suitable means, such as welding. Since the remainder of the mechanism is identical with the mechanism described hereinabove like reference numerals have been applied to like parts and further description is omitted since it would be repetitious.

While I have described my invention with reference to a preferred embodiment and a modification thereof, it will be understood that this description is intended to be illustrative only, and that various further modifications and changes could be made to it by persons skilled in the art without departing from the scope and spirit of my invention. Consequently, the limits of my invention should be determined from the following appended claims when taken in conjunction with the prior art.

I claim:

1. For use with a semi-trailer, a landing gear assembly comprising a landing gear connected to the semi-trailer for relative fore and aft movement, the said landing gear including ground engaging means actuatable between raised and lowered positions and means for raising and lowering the said ground engaging means between the said positions, and means connected to the said landing gear and the semi-trailer and responsive to operation of the said raising and lowering means for actuating the said landing gear forwardly and rearwardly relative to the semi-trailer, the said last-mentioned means including a support member fixed to the semi-trailer, a screw connected to the said landing gear so that operation of the said raising and lowering means causes rotation of the said screw, a first threaded member engageable by the said screw and connected to the said support member, means for maintaining the said threaded member at a predetermined location relative to the said support member, stop means connected to the said support member, and a second threaded member engaged by the said screw and connected to the said support member for reciprocal axial movement between the said first threaded member and stop means.

2. For use with a semi-trailer, a landing gear assembly comprising a landing gear connected to the semi-trailer for movement longitudinally thereof, the said landing gear including ground engaging means movable between raised and lowered positions and means for raising and lowering the said ground engaging means, and means for moving the said landing gear longitudinally of the said semi-trailer, the said last-mentioned means including an elongated tubular member connected to the semi-trailer, a screw connected to the said landing gear so that operation of the raising and lowering means causes rotation of the said screw, the said screw extending from the said landing gear into the said tubular member, a first threaded member disposed in the said tubular member and engageable by the said screw, means for normally maintaining the said first threaded member in a pre-determined location in the said tubular member, stop means connected to the said tubular member, and a second non-rotatable member engaged by the said screw and disposed in the said tubular member of sliding movement between the said stop and first threaded member.

3. For use with a first member and a second member connected to the first member for movement relative thereto, means for moving the second member relative to the first member comprising a support member connected to the first member, a screw rotatably connected to the second member, a first threaded member engageable by the said screw and connected to the said support member, means for normally maintaining the said first threaded member in a pre-determined location relative to the said support member, stop means fixed to the said support member, a second threaded member engaged by the said screw and connected to the said support member for sliding reciprocal movement between the said stop means and first threaded member, and means for preventing rotation of the said second theaded member.

4. For use with a semi-trailer, a landing gear assembly comprising a landing gear connected to the semi-trailer for movement longitudinally relative thereto, the said landing gear including ground engaging means movable between raised and lowered positions and means for raising and lowering the said ground engaging means, and means for moving the said landing gear longitudinally, the said longitudinal moving means including an elongated tubular member connected to the semi-trailer and having an open end, a screw connected to the said landing gear so that operation of the said raising and lowering means causes the said screw to rotate, the said screw extending longitudinally into the said tubular member through the said open end thereof, first and second longitudinally spaced apart stop means connected to the said tubular member, a first threaded member engageable by the said screw and disposed in the said tubular member in abutment with the said first stop means and between the said stop means, means operably connecting the said first threaded member to the said tubular member so that the said first threaded member can rotate in one direction only, a second threaded member engaged by the said screw and disposed in the said tubular member for sliding movement between the said second stop means and the said first threaded member, and means for holding the said second threaded member from rotation.

5. For use with a semi-trailer, a landing gear assembly comprising a landing gear connected to the semi-trailer for movement longitudinally relative thereto, the said landing gear including ground engaging means movable between raised and lowered positions and means for raising and lowering the said ground engaging means, and means for moving the said landing gear longitudinally, the said longitudinal moving means including an elongated tubular member connected to the semi-trailer, a screw extending into the said tubular member and connected to the said landing gear so that operation of the said raising and lowering means causes the said screw to rotate, first and second longitudinally spaced apart stop means connected to the said tubular member, a nut assembly disposed in the said tubular member in abutment with the said first stop means and between the said stop means, the said nut assembly including a support member slidably disposed in the said tubular member, a threaded member rotatably mounted in the said support member and engageable by the said screw and ratchet means for permitting rotation of the said threaded member in one direction only, and a non-rotatable nut threadably engaged by the said screw, the said nut being disposed in the said tubular member and movable between the said second stop and the said nut assembly.

6. For use with a semi-trailer, a landing gear assembly comprising a landing gear connected to the semi-trailer for movement longitudinally relative thereto, the said landing gear including ground engaging means movable between a raised and lowered position and means for raising and lowering the said ground engaging means, and means for moving the said landing gear longitudinally, the said longitudinal moving means including an elongated non-circular tubular member conected to the semi-trailer, a screw connected to the said landing gear so that actuation of the said raising and lowering means causes the said screw to rotate, the said screw extending longitudinally into the said tubular member, first and second longitudinally spaced apart stop means connected to the said tubular member, a first threaded member engageable by the said screw and disposed in the said tubular member in abutment with the said first stop means and between the said stop means, means operably connecting the said threaded member and the said tubular member so that the said threaded member is rotatable in one direction only, and a second threaded member engaged by the said screw and disposed in the said tubular member for sliding movement between the said second stop means and the first threaded member, the said second threaded member having an outer periphery which cooperates with the said tubular member to prevent rotation of the said second threaded member.

7. For use with a semi-trailer, a landing gear assembly comprising a landing gear connected to the semi-trailer for movement longitudinally relative thereto, the said landing gear including ground engaging means movable between raised and lowered positions and means for raising and lowering the said ground engaging means, and means for moving the said landing gear longitudinally, the said longitudinal moving means including an elongated tubular member connected to the semi-trailer and having an open end, a screw connected to the said landing gear so that operation of the said raising and lowering means causes the said screw to rotate, the said screw extending longitudinally into the said tubular member through the open end thereof, a first threaded member fixed in the said tubular member and engageable by the said screw, stop means connected to the said tubular member between the said open end and the said first threaded member, a second threaded member engaged by the said screw and disposed in the said tubular member for movement between the said first threaded member and the stop means, and means for preventing rotation of the said second threaded member.

8. For use with a semi-trailer, a landing gear assembly comprising a landing gear connected to the semi-trailer for movement longitudinally relative thereto, the said landing gear including ground engaging means movable between raised and lowered positions and means for raising and lowering the said ground engaging means, and means for moving the said landing gear longitudinally, the said longitudinal moving means including an elongated support member connected to the semi-trailer, a screw connected to the said landing gear so that operation of the said raising and lowering means causes the said screw to rotate, a first threaded member fixed to the said support member and engageable by the said screw, stop means connected to the said support member, and a non-rotatable threaded member engaged by the said screw and connected to the said support member for movement between the first threaded member and stop means.

References Cited by the Examiner

UNITED STATES PATENTS

| | | | |
|---|---|---|---|
| 1,898,854 | 2/1933 | Reid | 280–150.5 |
| 1,997,095 | 4/1935 | Allen | 254–86 |
| 2,150,701 | 3/1939 | Reid | 254–86 |

WILLIAM FELDMAN, *Primary Examiner.*

O. M. SIMPSON, *Assistant Examiners.*